United States Patent

[11] 3,536,032

| [72] | Inventor | Thomas W. Ridding |
| | | Collingwood, Ontario, Canada |
| [21] | Appl. No. | 763,837 |
| [22] | Filed | Sept. 30, 1968 |
| [45] | Patented | Oct. 27, 1970 |
| [73] | Assignee | Canadian General Electric Company Limited |
| | | Toronto, York, Ontario, Canada |
| | | a corporation of Canada |

[54] WATER LEVEL INDICATOR
4 Claims, 3 Drawing Figs.

[52] U.S. Cl. ..................................................... 116/118, 73/318
[51] Int. Cl. ...................................................... G01f 23/00
[50] Field of Search ........................................... 116/118, 135; 222/67; 62/176, 188; 73/317, 318; 200/84; 261/92

[56] References Cited
UNITED STATES PATENTS

| 2,446,844 | 8/1948 | | |
| 1,323,860 | 12/1919 | Molaver .................... | 200/84 |
| 1,391,813 | 9/1921 | Wilhelm ..................... | 73/318 |
| 1,523,168 | 1/1925 | Cole .......................... | 73/318 |
| 1,773,195 | 8/1930 | Moffat ....................... | 73/318 |
| 2,584,618 | 2/1952 | Robic ........................ | 261/92 |
| 2,797,577 | 7/1957 | Wilhelm ..................... | 73/318 |
| 3,044,272 | 7/1962 | Eisendrath ................. | 200/84X |
| 3,266,481 | 8/1966 | Wentling et al. ........... | 261/92X |

*Primary Examiner*—Louis J. Capozi
*Attorneys*—Lawrence R. Kempton, Leonard J. Platt, Frederick P. Weidner, Jr., Frank L Neuhauser, Oscar B Waddell and Melvin M Goldenberg

ABSTRACT: This disclosure concerns a device for measuring and visually indicating the amount of water in a reservoir of a water using appliance such as a humidifier. A float mechanism is hingedly positioned above the water reservoir so that the float mechanism will move responsive to the amount of water in the reservoir. A portion of the float mechanism is connected to a cord which has attached thereto a marker that moves along a graduated scale to visually indicate the amount of water in the reservoir.

INVENTOR.
Thomas W. Ridding

Patented Oct. 27, 1970

INVENTOR.
Thomas W. Ridding
BY
Lawrence R. Kempton
Attorney

3,536,032

WATER LEVEL INDICATOR

BACKGROUND OF THE INVENTION

This invention relates to an indicating mechanism for use in conjunction with a water reservoir to visually indicate the amount of water in the reservoir.

This invention is particularly adapted for use in a portable humidifier wherein a water reservoir occupies the lower portion thereof, which may be removed in a drawer-like manner, and evaporative material in the form of a drum is rotatably supported within the reservoir. This type of humidifier normally has means for introducing air into the humidifier, flowing the air through the rotating evaporative material, and then expelling the moisture laden air out of the humidifier through an air outlet opening. For the purpose of a proper and safe operation of a humidifier of this type, it is useful to have an indication of the amount of water contained at any time in the reservoir. The means for indicating this should be located in a visually convenient place which may be quite remote from the reservoir. However, a problem with such a water level indicator, is that part of its mechanism extends into the reservoir and thereby will obstruct any drawer-like movement of the reservoir.

SUMMARY OF THE INVENTION

In accordance with this invention, a water level indicator is provided for use within a water-using appliance which includes a housing and a water reservoir located in the lower portion of the housing. The indicator extending from the water reservoir to the top of the housing comprises a float mechanism hingedly positioned above the water reservoir and a cord operatively connected with the float mechanism. A marker, is attached to the cord for movement along a graduated scale which is located at the top of the housing. When the water reservoir is empty, the marker reaches one end position on the graduated scale and visually indicates this condition. The marker will also at this time actuate a switch in the electrical control circuit of the appliance thereby terminating the operation of the appliance.

DESCRIPTION OF THE PREFERRED EMBODIMENT

Figure 1:
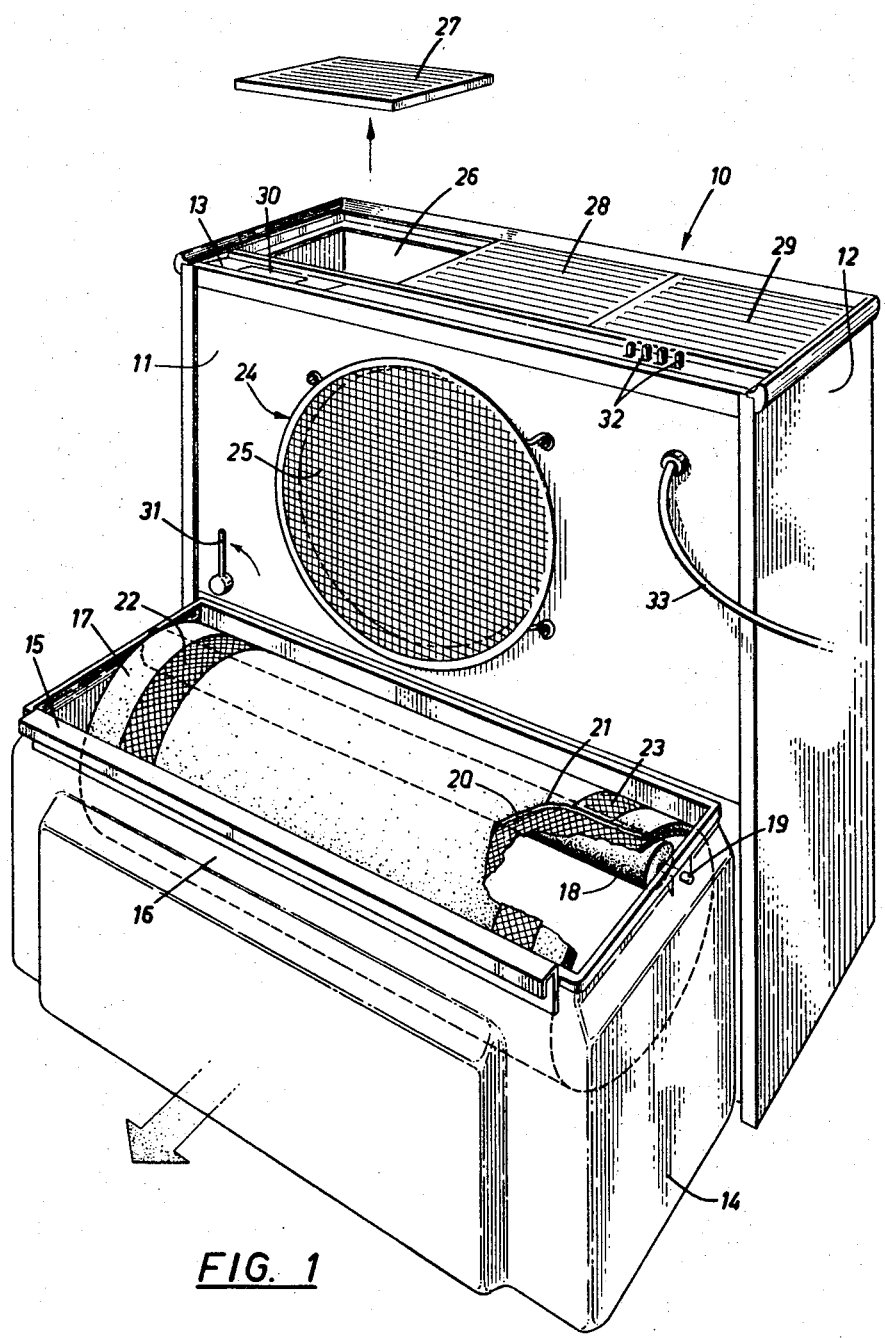
FIG. 1 is a perspective rear view of a portable humidifier showing a partially pulled-out water reservoir in the lower portion of the housing.

Referring now to FIG. 1, there is shown a humidifier cabinet or housing 10 from the rear thereby exposing rear wall 11, side wall 12 and top wall 13. Housing 10 is preferably rectangular in shape but can be given other shapes if so desired. The rear wall 11 covers only the upper portion of housing 10 thereby leaving an opening in the lower portion for inserting or withdrawing water reservoir 14 in the form of a drawer. In order to facilitate these movements, a handle 15 is provided preferably along the top edge of rear wall 16 of water reservoir 14. Evaporative material in the form of a cylinder or drum 17 is rotatably supported within water reservoir 14 by a roller 18 secured in the end walls of water reservoir 14 as seen at 19. Drum 17 and roller 18 extend substantially through the entire length of water reservoir 14 and form a unit with the reservoir which may be readily withdrawn from and returned into housing 10.

Drum 17 consists of a supporting layer 20 made of a netted plastic material which is covered by a layer of foam plastic 21 such as polyurethane foam. Two clamping strips 22 and 23 secure layer 21 to supporting layer 20. Roller 18 is also made of a plastic material. An air inlet opening 24 preferably of circular shape is provided in rear wall 11 and covered by a screen plate 25. An air outlet opening 26 occupies the major part of top wall 13 and is covered by louvers 27, 28, and 29. The louvers are provided with fixed slanting vanes and preferably are of a square shape so that they can be inserted into the air outlet opening in four different positions. This makes it possible to change the direction of the air flow emitting from the humidifier as required. In the remaining part of top wall 13, a water level indicator 30 is located which indicates the amount of water in reservoir 14. A float mechanism may be used for this purpose which extends into the reservoir and may be retracted therefrom by a handle 31 or by any other retraction means. Several switch buttons 32 are also located on top wall 13 for controlling the electrical system of the humidifier. Electrical connection 33 is used to correct the humidifier with a source of electrical energy.

Figure 2:
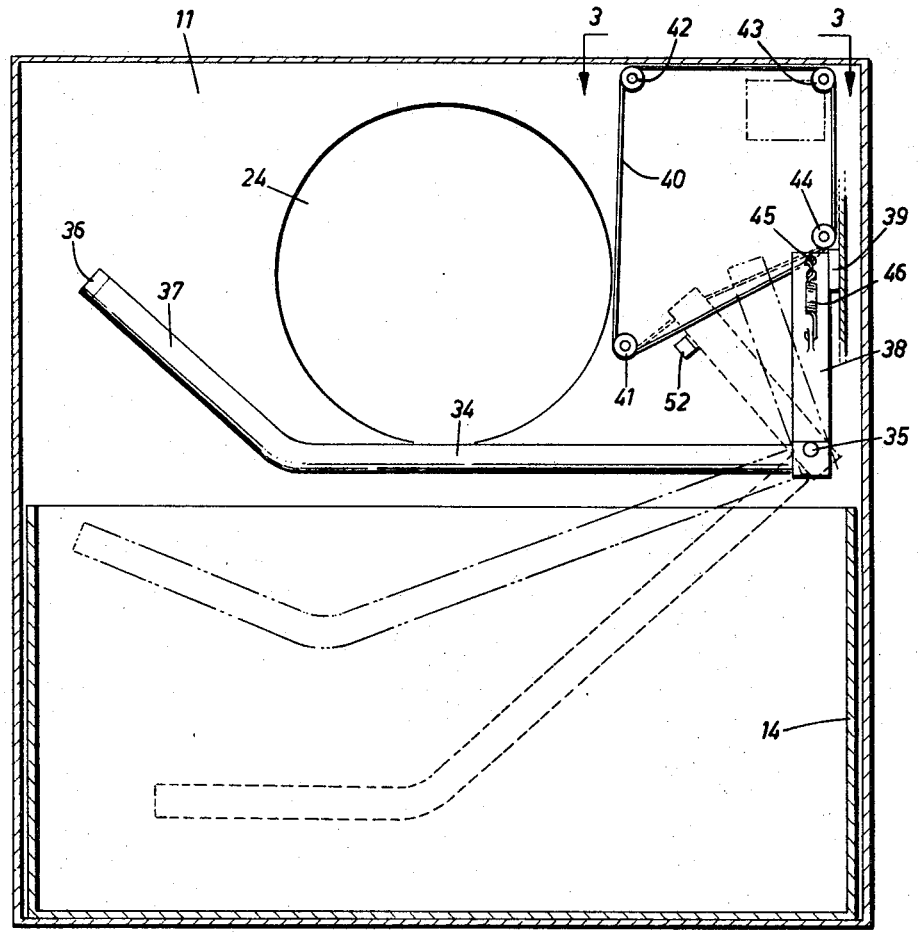
FIG. 2 is a schematic elevation view of the inside surface of the rear wall of the humidifier housing.

FIG. 2 illustrates schematically the arrangement of the water level indicator on the inside surface of rear wall 11 of the humidifier shown in FIG. 1. A float mechanism in the form of a tube 34 preferably made of a suitable plastic material has one end connected to a pin 35 which extends through an opening in rear wall 11 and is rotatably secured therein. On the outside of the humidifier housing, pin 35 is connected to handle 31 for operation (FIG. 1). The free end of tube 34 is provided with a watertight seal 36 and a portion 37 of the tube end is bent at an angle to the remaining portion of the tube. A lever arm 38 is attached to the pinned tube end and extends therefrom substantially at a right angle with respect to tube 34 as well as pin 35. In the illustrated nonoperating position of the float mechanism, lever arm 38 touches a magnetic catch 39 attached to the housing of the humidifier. A cord 40 is secured to the free end of lever arm 38 and forms a loop which runs by means of guide rolls 41, 42, 43, and 44 over the top of the humidifier housing and back to lever arm 38. Here, both ends of cord 40 enter through an opening 45 at the free end of lever arm 38 and are then connected to the arm by means of a spring 46. Any slack that may occur is taken up by this spring so that the cord loop is kept taut at all times.

Figure 3:
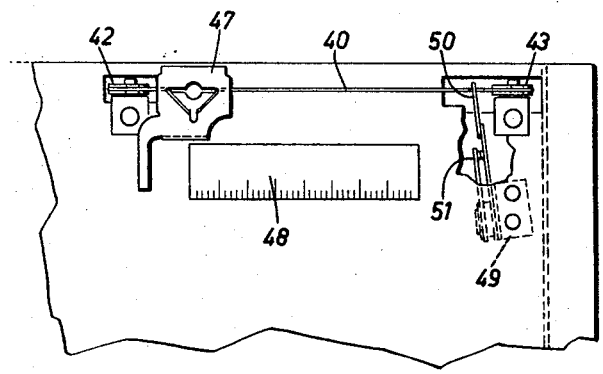
FIG. 3 is a partial top view of the humidifier housing along line 3-3 of FIG. 2.

FIG. 3 which is a partical top view of the humidifier housing shows the indicating means of the water level indicator. A marker 47 is connected to cord 40 and slides in accordance with the position of tube 34 along a graduated scale 48. Arriving at a position indicating an empty or nearly empty water reservoir, the marker actuates a switch 49 by touching a contact arm 50 and separating it from an oppositely disposed contact arm 51. At this moment lever arm 38 (FIG. 2) abuts stop 52 and a further down movement of the float mechanism is prevented.

The operation of the water level indicator is as follows:

If nonoperative, as shown in FIG. 2, tube 34 of the water level indicator is kept by the magnetic catch 39 in a substantially horizontal position well above the water reservoir. The water reservoir 14 indicated in broken line may freely be removed from the housing and later after servicing returned to the housing. Tube 34 is lowered by means of handle 31 into the reservoir where it floats on the water surface. The height of the water level which is directly proportional to the amount of water contained in the reservoir, is indicated by marker 47 on scale 48. When the water level has fallen to a predetermined amount, marker 47 will open switch 49. Since switch 49 is located in the control circuit, this will automatically terminate the operation of the humidifer.

The foregoing is a description of the preferred embodiment of the invention, and variations may be made thereto without departing from the spirit of the invention, as defined in the appended claims.

I claim:

1. A water level indicator device for use with a water-using applicance including a housing and a water reservoir located in the lower portion thereof, said indicator device extending from said lower portion to the top portion of said housing and comprising switch means for terminating the operation of the appliance, a float mechanism hingedly positioned above said water reservoir, a cord operatively connected with said float mechanism, and a marker attached to said cord for movement along a graduated scale located at the top of said housing, said marker being adapted to indicate an empty water reservoir in one end position on the graduated scale and actuate the switch to thereby terminate the operation of the appliance when in said position.

2. A water level indicator device for use with a water-using appliance including a housing and a water reservoir located in the lower portion thereof, said indicator device extending from said lower portion to the top portion of said housing and comprising a float mechanism in the form of an elongated tube, said tube having one end sealed and the other end attached to a lever arm which extends substantially at a right angle with respect to said tube, a cord secured to the free end of said lever arm which cord runs from the lever arm to the top of said housing, along a portion of the top of the housing and back to said lever arm to form a loop, said cord being maintained taut by means of a spring interposed between the cord and the free end of the lever arm, and a marker operated by said cord so as to slide along said portion of the top of the housing.

3. A water level indicator device for use with a water-using appliance including a housing and a removable water reservoir located in the lower portion thereof, said indicator device extending from said lower portion to the top portion of said housing and comprising a float mechanism in the form of an elongated tube, said tube having one end sealed and the other end attached to a lever arm which extends substantially at a right angle with respect to said tube and rotatatably secured to the wall of the housing by a pin that extends through the wall, a cord secured to the free end of said lever arm which cord runs from the lever arm to the top of said housing, along a portion of the top of the housing and back to said lever arm to form a loop, a marker operated by said cord so as to slide along said portion of the top of the housing, a handle attached to the pin outside the housing for manually raising the tube to a vertical position to facilitate removal of the reservoir, and means to retain the tube in the vertical position.

4. The water level indicator device of claim 3 wherein the means to retain the tube in the vertical position is a magnetic catch attached to said housing and arranged to contact the lever arm when the tube is in said position.